United States Patent
Suzui

(10) Patent No.: US 8,104,051 B2
(45) Date of Patent: Jan. 24, 2012

(54) DISK DEVICE FOR LOADING AND UNLOADING A DISK WITH A CONVEYANCE ROLLER

(75) Inventor: Yuichiro Suzui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 21 days.

(21) Appl. No.: 12/746,084

(22) PCT Filed: Nov. 21, 2008

(86) PCT No.: PCT/JP2008/003439
§ 371 (c)(1),
(2), (4) Date: Jun. 3, 2010

(87) PCT Pub. No.: WO2009/104228
PCT Pub. Date: Aug. 27, 2009

(65) Prior Publication Data
US 2010/0251275 A1   Sep. 30, 2010

(30) Foreign Application Priority Data
Feb. 21, 2008  (JP) ................................ 2008-040045

(51) Int. Cl.
*G11B 17/04* (2006.01)
(52) U.S. Cl. ...................................... 720/624
(58) Field of Classification Search .................. 720/617, 720/624, 625, 619, 626
See application file for complete search history.

(56) References Cited

U.S. PATENT DOCUMENTS

| | | | |
|---|---|---|---|
| 5,768,247 A * | 6/1998 | Kim et al. ...................... | 720/624 |
| 6,480,442 B1 * | 11/2002 | Nakatani et al. ........... | 369/30.36 |
| 6,510,110 B2 * | 1/2003 | Watanabe et al. .......... | 369/30.32 |
| 7,281,256 B2 * | 10/2007 | Huang ........................... | 720/624 |
| 7,937,720 B2 * | 5/2011 | Inoue et al. ................... | 720/624 |
| 2002/0150020 A1 * | 10/2002 | Mizoguchi et al. .......... | 369/77.1 |
| 2005/0050565 A1 * | 3/2005 | Yoshimura .................... | 720/624 |
| 2005/0237905 A1 * | 10/2005 | Nabe et al. .................... | 369/120 |
| 2005/0251815 A1 * | 11/2005 | Lin ................................ | 720/626 |
| 2006/0117330 A1 | 6/2006 | Choi | |
| 2006/0117331 A1 * | 6/2006 | Joo et al. ....................... | 720/626 |
| 2007/0288946 A1 * | 12/2007 | Chang et al. .................. | 720/626 |
| 2008/0010650 A1 | 1/2008 | Fujisawa | |

FOREIGN PATENT DOCUMENTS

| | | |
|---|---|---|
| JP | 62-110754 U | 7/1987 |
| JP | 6-15897 A | 1/1994 |
| JP | 11-312352 A | 11/1999 |
| JP | 2001-338456 A | 12/2001 |
| JP | 2006-155854 A | 6/2006 |
| JP | 2006252607 A * | 9/2006 |
| JP | 2008-16129 A | 1/2008 |

* cited by examiner

*Primary Examiner* — Brian Miller
(74) *Attorney, Agent, or Firm* — Birch, Stewart, Kolasch & Birch, LLP

(57) ABSTRACT

A disk device includes: a slider member 4 to be pushed and moved by the movement of a disk detection member 8 detecting the loading of a disk when the disk 5 is loaded in a predetermined position of a device body; a drive gear 62 moved in a thrust direction by the movement of the slider member 4 to be unmeshed from a rotation gear 61 integral with a conveyance roller 6; and a coil spring 65 that normally urges the drive gear 62 in a direction meshing with the rotation gear 61.

4 Claims, 8 Drawing Sheets

DISK DEVICE FOR LOADING AND UNLOADING A DISK WITH A CONVEYANCE ROLLER

TECHNICAL FIELD

The present invention relates to a disk device for loading and unloading a disk into and from a device body with a conveyance roller.

BACKGROUND ART

In conventional disk devices, for example, as disclosed in Patent Document 1, when a disk is carried to a reproducing position where the disk is loaded onto a turntable by rotation of a conveyance roller, a slider member is pushed and moved toward the front side of a device parallel to the carrying direction of the disk by the movement of a disk detection member that detects the loading of the disk. The disk is clamped on the turntable by the movement of the slider member, further a reproducing base is unlocked from a chassis that is a device body to go to a state of disk reproduction. At that time, a roller base member for supporting the conveyance roller is also in engagement with the slider member, and the roller base member rotates about a rotation shaft by the movement of the slider member. Thus, the conveyance roller is adapted to be lowered and retreated from the disk.

Patent Document 1: JP-A-1999-312352 (JP-A-11-312352)

DISCLOSURE OF THE INVENTION

However, according to the arrangement of conventional disk devices as described above, even after completion of carrying operation of the disk to the reproducing position, the conveyance roller continues the rotation until the mesh of a rotation gear that is provided on the conveyance roller with a drive gear for transmitting a rotation driving force from a drive source such as a motor to the rotation gear is completely released.

For this reason, the conveyance roller will continue the rotation in a state where the roller comes in contact with the disk that is carried to the reproducing position to be positioned there, causing slippage between the disk and the conveyance roller. As a result, there is a problem that the disk is scratched. Further, also in a disk-unloading operation, before clamping with the disk is completely released, the drive gear and the rotation gear mesh with each other to start the unloading operation of the disk, and thus there is a problem that the disk is abraded by a convex portion on the reproducing base to cause scratches.

Thus, in order to solve the above-mentioned problems, there is a method of reducing the friction between the disk and the conveyance roller and adjusting the timing by the shape of a cam of the slider member; however, a disk-carrying force is reduced because of reduced friction therebetween, an operation load increases because the pressure angle of a cam section of the slider member is increased by the timing adjustment, or the operation time is extended and/or components thereof are upsized by the enlarged cam section. Thus, there is the occurrence of a problem that the device cannot be downsized.

Meanwhile, as shown in FIG. 13, it is contemplated to dispose a drive gear 102 for transmitting a rotation drive to a rotation gear 101 integral with a shaft 105 of a disk conveyance roller on the upside of the rotation gear 101 and further downwardly retract the rotation gear 101 by using a cam face 104 of a slide member 103 that horizontally moves to thereby release the mesh between both gears in a short time. However, the arrangement requires a large size in a vertical direction to be unsuitable for a disk device oriented to a reduced thickness.

Also, as shown in FIG. 14, it is also contemplated to dispose a rotation gear 101 and a drive gear 102 in a substantially lateral direction to reduce the thickness of the device; however, in this arrangement, a considerable time elapses before a roller base member (not shown) journaling a disk conveyance roller rotates about a fulcrum O and then the rotation gear 101 integral with a shaft 105 of the disk conveyance roller rotates around the surface of the drive gear 102 to thereby release the mesh therebetween. Thus, there is a problem that scratching onto a disk cannot be overcome.

The present invention has been made to solve the above-mentioned problems, and an object of the present invention is to provide a disk device in which scratches of a disk due to the slippage caused between the disk and a conveyance roller are prevented, and also downsizing of the device is schemed by reducing the operation stroke of a slider member without increasing the operation load of the slider member.

The disk device according to the present invention, the disk device includes: a slider member to be pushed and moved by the movement of a disk detection member detecting the loading of a disk, when the disk is loaded in a predetermined position of a device body; a drive gear that is moved in a thrust direction by the movement of the slider member to be unmeshed from a rotation gear integral with a shaft of a disk conveyance roller; and an urging member that normally urges the drive gear in the direction in which the drive gear meshes with the rotation gear.

According to the present invention, when a disk is loaded in a predetermined position of the device body, the drive gear is moved in a thrust direction by the movement of the slider member pushed and moved by the movement of the disk detection member, the mesh of the drive gear with the rotation gear to be integral with the shaft of the disk conveyance roller is released, and after the disk is carried to the reproducing position, the rotation of the conveyance roller can be stopped in a short time. As a result, scratches onto the disk can be prevented, due to the slippage that could be caused by the rotation of the conveyance roller in the state where the roller is in contact with the disk, and also it is eliminated to extend the operation stroke of the slider member more than necessary without increasing the operation load of the slider member, thereby achieving downsizing of the device.

BRIEF DESCRIPTION OF THE DRAWINGS

FIG. 13 is an explanatory view of the engagement and disengagement of a drive gear with a rotation roller integral with a conventional disk conveyance roller.

FIG. 14 is an explanatory view of the engagement and disengagement of a drive gear with a rotation roller integral with another conventional disk conveyance roller.

BEST MODE FOR CARRYING OUT THE INVENTION

Embodiments of the present invention will now be described with reference to the accompanying drawings in order to explain the present invention in more detail.

First Embodiment

Figure 1:
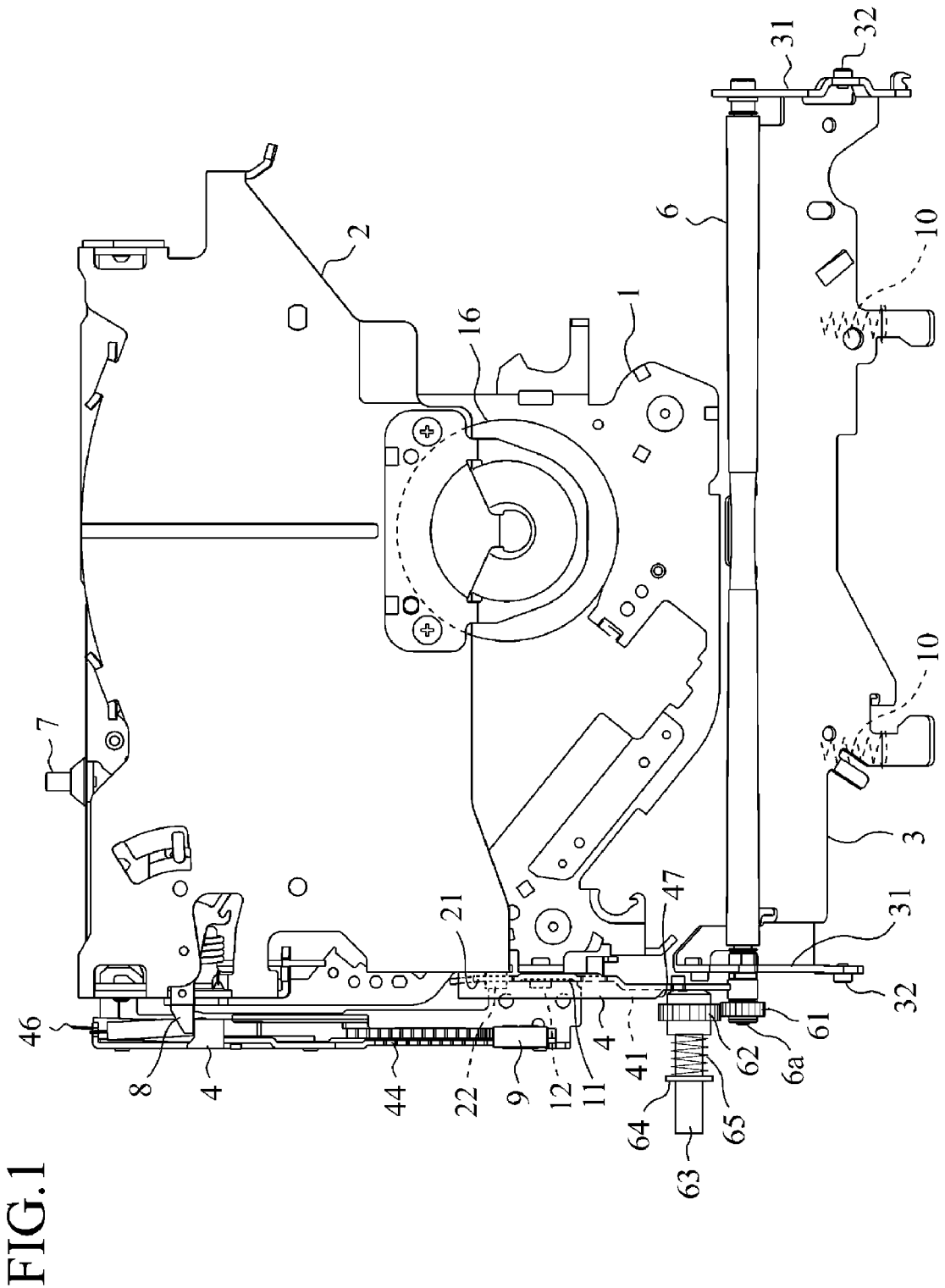
FIG. 1 is a plan view showing only the main part in a standby condition for disk loading in a disk reproducing apparatus in accordance with a first embodiment of the present invention.
Figure 2:
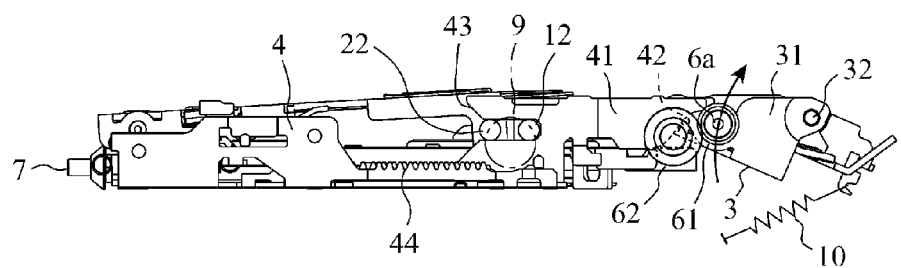
FIG. 2 is a left side view of FIG. 1.
Figure 3:
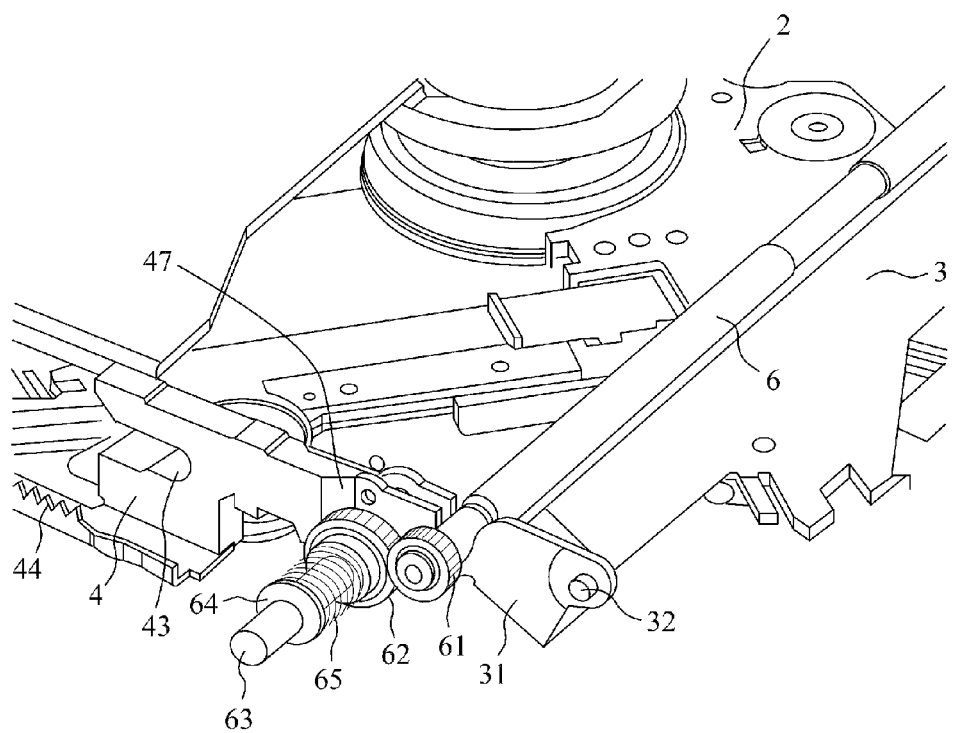
FIG. 3 is a perspective view of a conveyance roller drive shown in FIG. 1.
Figure 4:
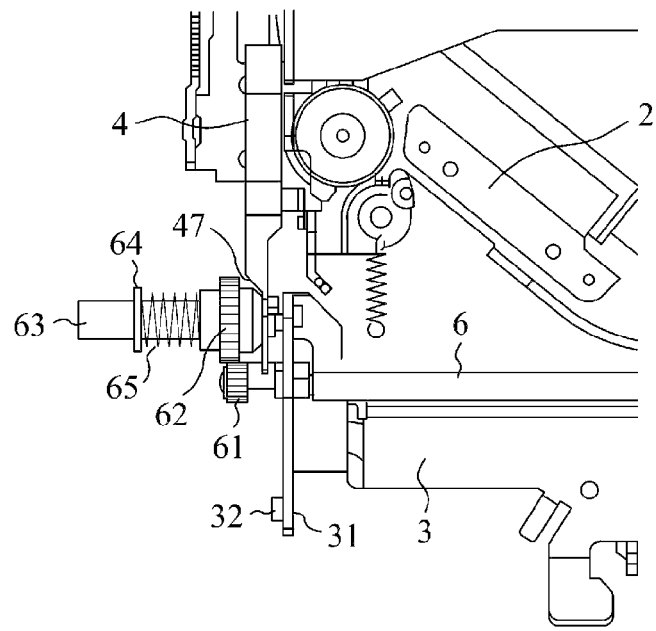
FIG. 4 is a plan view of FIG. 3.
Figure 5:
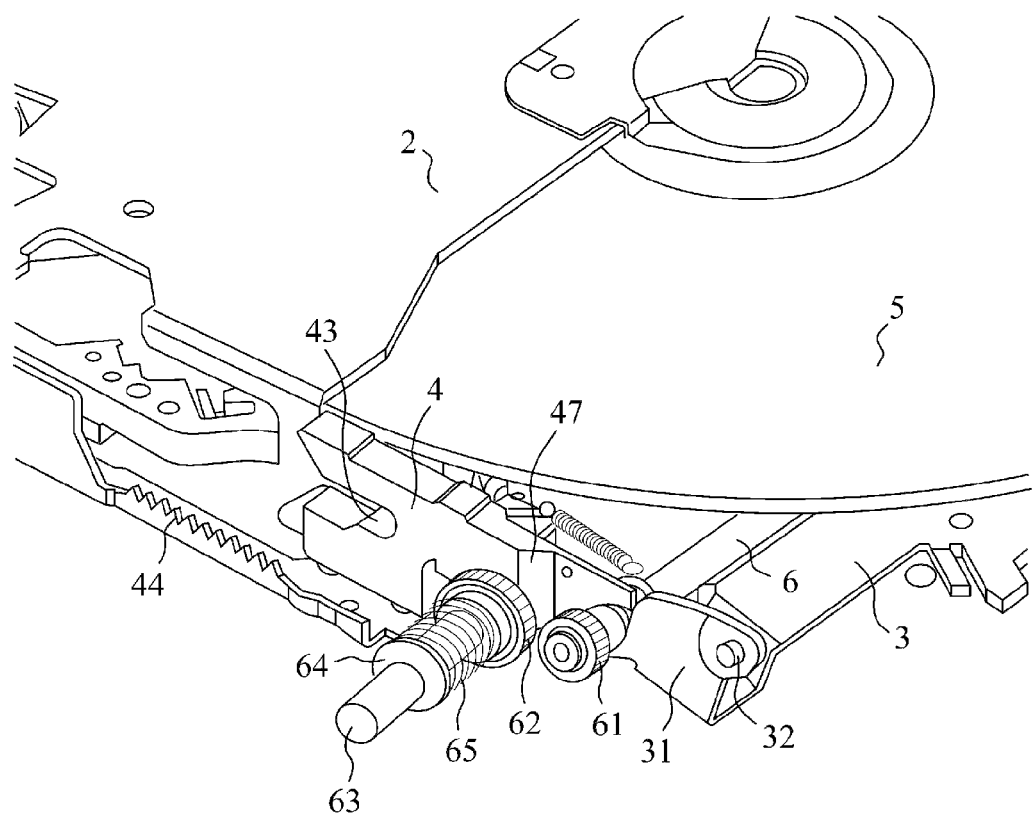
FIG. 5 is a perspective view of an essential part showing a state after completion of a disk carrying operation.
Figure 6:
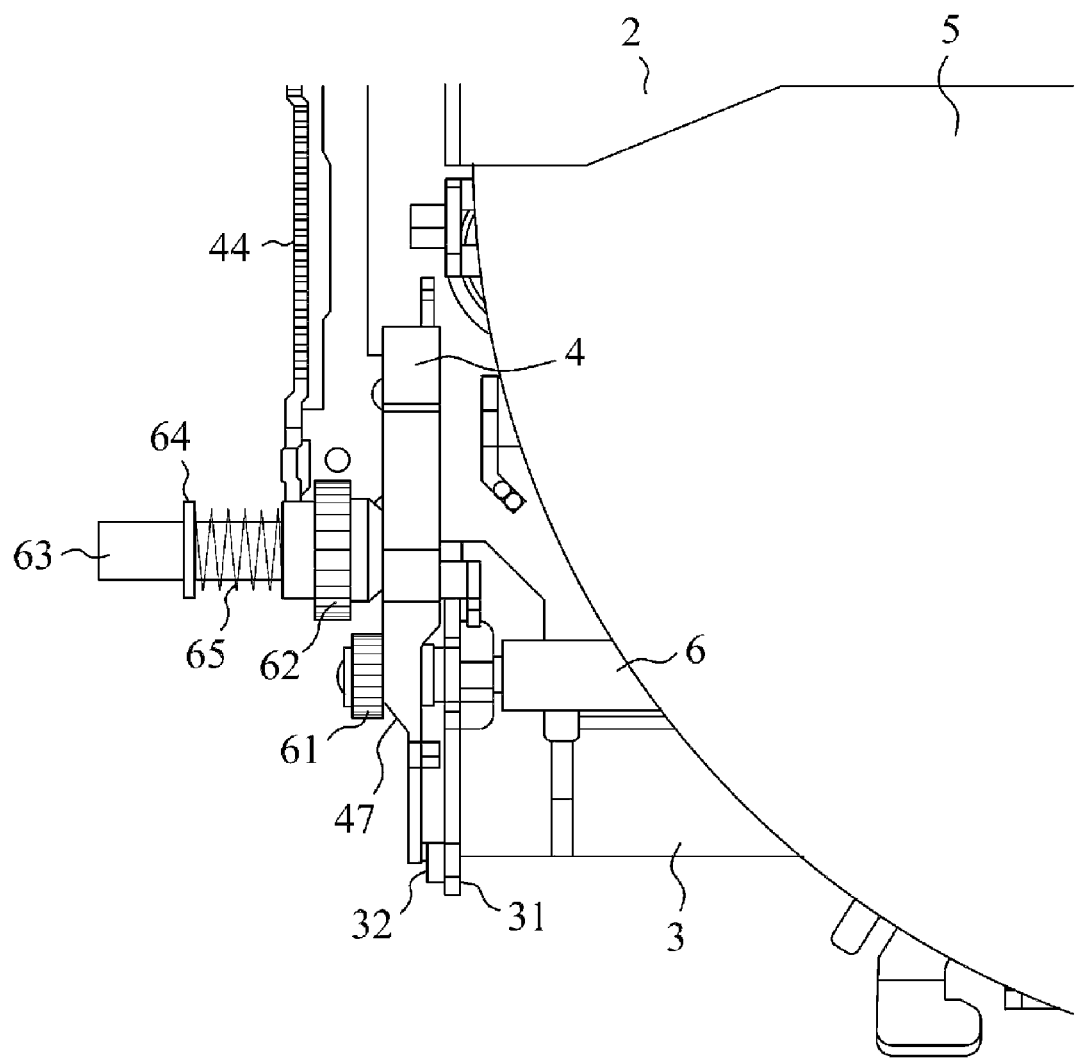
FIG. 6 is a plan view of FIG. 5.
Figure 7:
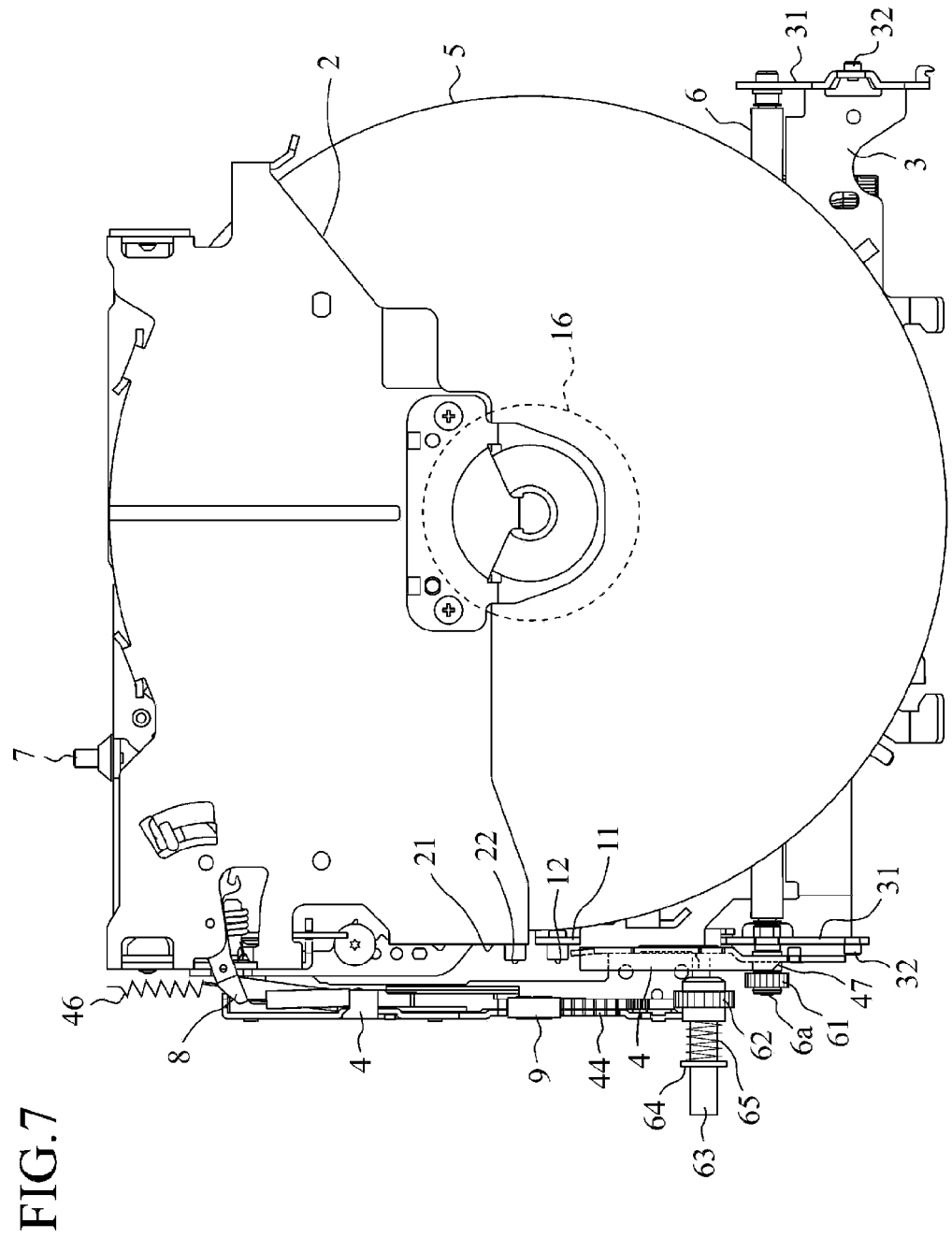
FIG. 7 is a plan view showing only the main part in a disk reproducing state.
Figure 8:
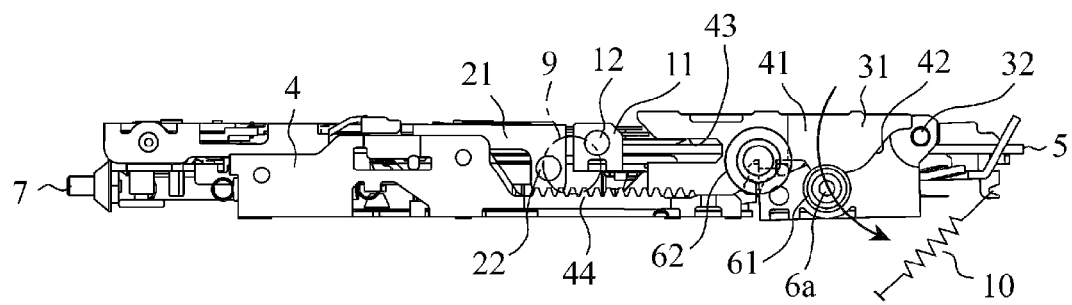
FIG. 8 is a left side view of FIG. 7.
Figure 9:
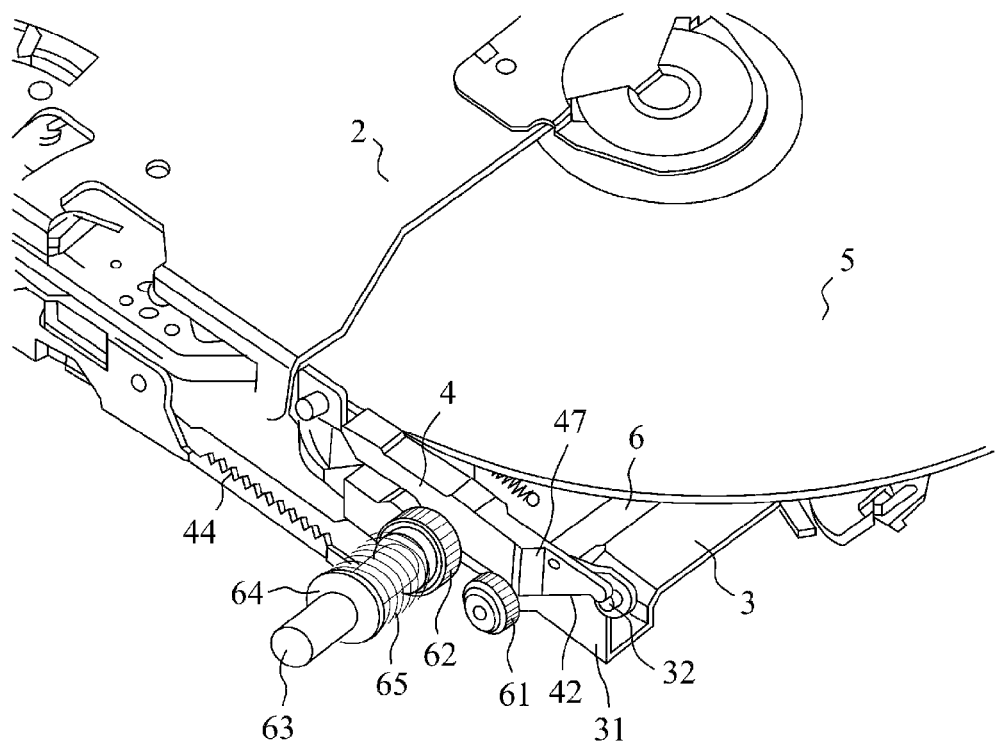
FIG. 9 is a perspective view of a conveyance roller drive shown in FIG. 7.
Figure 10:
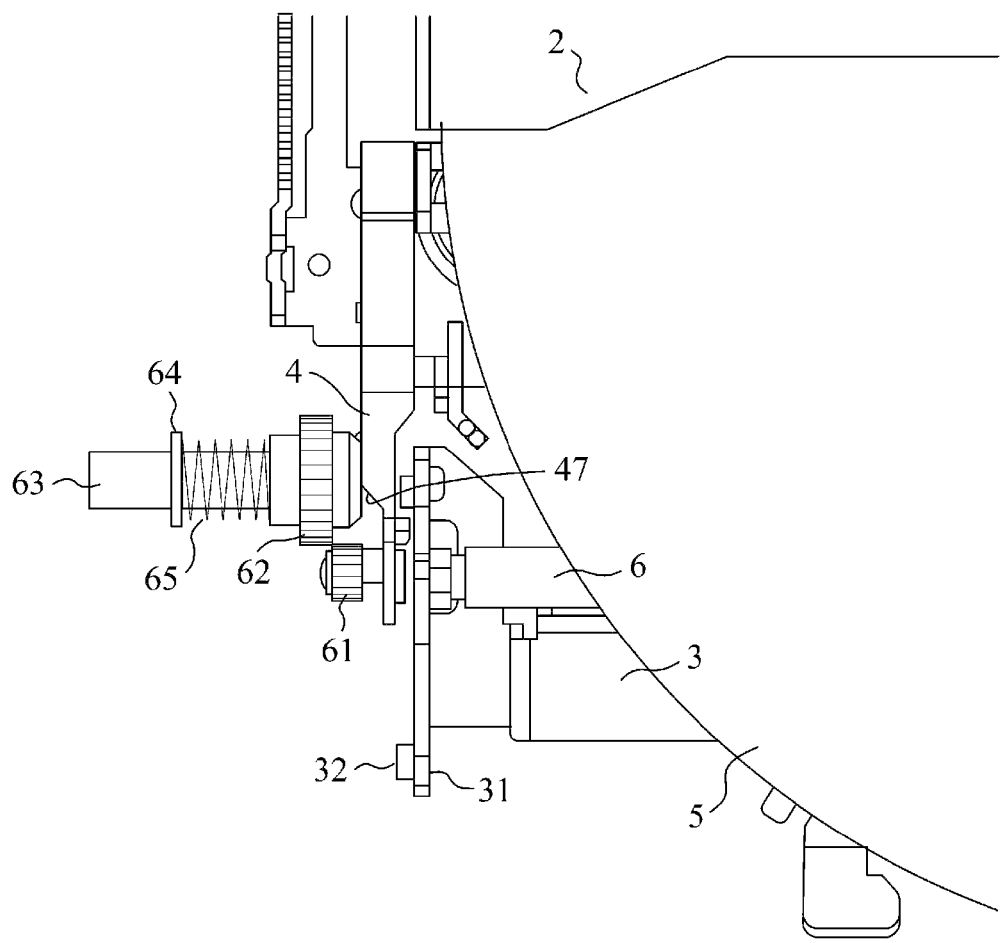
FIG. 10 is a plan view of FIG. 9.

FIG. 1 is a plan view showing only the main part in a standby condition for disk loading in a disk reproducing apparatus in accordance with a first embodiment of the present invention, FIG. 2 is a left side view of FIG. 1, FIG. 3 is a perspective view of a conveyance roller drive shown in FIG. 1, FIG. 4 is a plan view of FIG. 3, FIG. 5 is a perspective view of an essential part showing a state after completion of a disk carrying operation, FIG. 6 is a plan view of FIG. 5, FIG. 7 is a plan view showing only the main part in a disk reproducing state, FIG. 8 is a left side view of FIG. 7, FIG. 9 is a perspective view of a conveyance roller drive shown in FIG. 7, and FIG. 10 is a plan view of FIG. 9.

A disk device in accordance with the first embodiment of the present invention includes a reproducing base 1, an arm clamp 2, a roller base member 3, and a slider member 4. The reproducing base 1 is provided to be locked on or unlocked from a chassis board through a support member (not shown) and includes a turntable 16. The arm clamp 2 is rotatably supported by a chassis board (not shown) on the loading recess side of a disk 5.

Side plates 31, 31 bent substantially perpendicularly from both ends of the roller base member 3 are supported by the chassis board (not shown) rotatably on shafts 32, 32. Further, both ends of a shaft 6 of a disk conveyance roller for carrying the disk 5 are rotatably supported by the side plates 31, 31, and a rotation gear 61 engaging with and disengaging from a drive gear 62 is provided at one end of a shaft 6a passing through the side plate 31. The drive gear 62 is assembled movably in a thrust direction (in an axial direction) around a shaft 63 supported by the chassis board (not shown), and is normally urged in a direction where the drive gear meshes with the rotation gear 61 by the urging force of a coil spring 65 as an urging member that is provided between the drive gear and a flange 64 attached around the shaft 63. Also, a spring 10 for exerting a rotating force in the direction of an arrow in FIG. 2 on the roller base member 3 is provided between the roller base member 3 and the chassis board (not shown) so as to normally hold the conveyance roller 6 in a disk conveying position.

The slider member 4 is supported movably back and forth along the side plate 31 by the chassis board (not shown), and a spring 46 for backwardly urging the slider member 4 is provided between the slider member 4 and the chassis board (not shown). A disk detection member 8 is engaged with the slider member 4 so as to move the slider member 4 forwardly (to the front face side of the disk device) when the disk detection member is rotated in response to detection of the loading of the disk 5.

Then, a cam section 42 for downwardly forcing the roller base member 3 through the shaft 6a against the urging force of the spring 10 is provided on a bottom face on the forward end side of a side plate 41 that is bent substantially perpendicularly of the slider member 4 in proximity to the side plate 31, and a cam section 47 for pushing and moving the drive gear 62 in a thrust direction against the urging force of the coil spring 65 is provided on the side face of the perpendicularly bent side plate 41. Also, a cam groove 43 is provided on the rear end side of the side plate 41. The cam groove 43 engages with and disengages from a pin 12 provided on an outer face of a side plate 11 of the reproducing base 1 and a pin 22 provided on the outer face of a side plate 21 of the arm clamp 2. Also, the slider member 4 has a rack 44 in the front-to-back direction parallel to the cam groove 43. The rack 44 is arranged to receive a drive gear 9 provided on the chassis board (not shown) and meshing with the rack.

Next, the operation thereof will be described. First, in a standby condition for disk loading as shown in FIG. 1 to FIG. 4, the slider member 4 is retracted by the urging force of the spring 46 to be held in a standby position. As a result, the rack 44 is disengaged from the drive gear 9, and the cam section 42 of the slider member 4 does not act on the shaft 6a of the conveyance roller 6. For this reason, the roller base member 3 receives the urging force of the spring 10 to rotate in the direction of the arrow in FIG. 2 with the shaft 32 of the side plate 31 as a fulcrum and hold the conveyance roller 6 in the disk conveying position. At that time, the drive gear 62 is urged in mesh with the rotation gear 61 by the urging force of the coil spring 65.

In the standby condition for disk loading as shown in FIG. 1 to FIG. 4, when a disk 5 is loaded, the drive gear 62 provided on the chassis board (not shown) starts rotation based on a signal from a detection member (not shown) that detects the loading, and the conveyance roller 6 rotates through the rotation gear 61 engaging with the drive gear 62. Then, the loaded disk 5 is carried by and sandwiched between the conveyance roller 6 and a disk guide (not shown) onto a predetermined position shown in FIG. 5 and FIG. 6, namely, the turntable 16.

When the disk 5 is conveyed to the predetermined position shown in FIG. 5 and FIG. 6, the disk detection member 8 pushed and moved by the carried disk 5 moves from the position shown in FIG. 1 to the position shown in FIG. 7 to push and move the slider member 4 forwardly (to the front face side of the device body) against the urging force of the spring 46. Thereby, the rack 44 of the slider member 4 meshes with the drive gear 9, and after that, as shown in FIG. 7 to FIG. 10, the slider member 4 further forwardly moves as the drive gear 9 rotates. With the movement thereof, first, the cam section 47 of the slider member 4 acts on the drive gear 62 to move the drive gear 62 in the thrust direction against the urging force of the coil spring 65, and thereby releases the mesh of the drive gear with the rotation gear 61. Consequently, the conveyance roller 6 stops at once to avoid the slipping rotation between the conveyance roller and the disk 5. Upon or immediately after the operation, the cam section 42 located on the bottom face on the forward end side of the slider member 4 acts on the shaft 6a of the conveyance roller 6 to rotate the roller base member 3 through the shaft against the urging force of the spring 10 in the direction of an arrow shown in FIG. 8, and force the conveyance roller 6 downwardly of the disk 5.

On the other hand, by the movement of the slider member 4, the pin 12 provided on the outer face of the side plate 11 of the reproducing base 1 and also the pin 22 provided on the outer face of the side plate 21 of the arm clamp 2 are disengaged from the cam groove 43, and a support member 7 of the reproducing base 1 is also disengaged by the movement of a lock plate (not shown) in engagement with the slider member 4 simultaneously with the disengagements of the pins. For this reason, the reproducing base 1 is unlocked, and is rockably held by the chassis board (not shown) through the support member 7. Further, the arm clamp 2 is also unlocked, and is rotated to press the disk 5 onto the turntable 16 and hold the disk thereon. Therefore, vibration from a vehicle body is prevented from propagating to the reproducing base 1 by the support member 7, and the disk 5 is surely held on the turntable 16, thus enabling the disk to be reproduced with stability.

After the reproduction of the disk 5 is completed, when the process proceeds to the unloading step of the disk 5, the slider member 4 is retreated by the inverse rotation of the drive gear 9. The roller base member 3 is released from the depressing force exerted by the slider member 4 owing to the retreating operation to be rotated and returned to the state shown in FIG. 2 by the urging force of the spring 10. Further, the drive gear 62 is released from the pressure of the cam section 47 formed on the perpendicularly bent side of the slider member 4 leading to the cam section 47, and the drive gear is pushed and moved in a thrust direction by the urging force of the coil spring 65 to mesh with the rotation gear 61. Moreover, the conveyance roller 6 also reversely rotates through the rotation gear 61 by the inverse rotation of the drive gear 62 to unload the disk 5 therefrom.

On the other hand, the slider member 4 is retreated by the mesh between the rack 44 and the drive gear 9 that reversely rotates. Then, when the mesh between the rack 44 and the drive gear 9 is released, the slider member 4 retreats to the standby position by the urging force of the spring 46 while returning the disk detection member 8 to the initial position, and the slider member goes to the standby condition for disk loading as shown in FIG. 1 and FIG. 2.

As discussed above, in accordance with the first embodiment, it is arranged that by the movement of the slider member 4 pushed and moved by the movement of the disk detection member 8, the drive gear 62 is moved in the thrust direction to be unmeshed from the rotation gear 61 integral with the conveyance roller 6, and thus the transmission of power to the rotation gear 61 can be stopped in a short time after the disk 5 is carried to the reproducing position. As a result, a period of time that the conveyance roller 6 continues to make a slipping rotation in the state where the roller comes in contact with the disk 5 can be reduced, and scratches onto the disk 5 can be prevented. Therefore, the slider member 4 does not bring about an increase of the operation load owing to an increase of the pressure angle of the cam section 47 or an increase of the operation time owing to an enlargement of the cam section, and/or upsizing of components. Thus, the operation stroke of the slider member can be reduced to thus achieve downsizing of the device.

Second Embodiment

Figure 11:
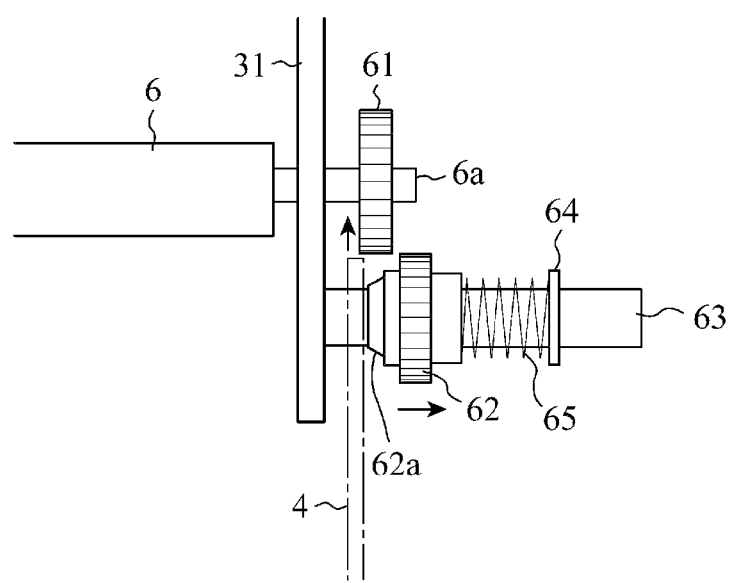
FIG. 11 is a perspective view of an essential part of a disk reproducing apparatus in accordance with a second embodiment of the present invention.

In the first embodiment discussed above, the disk device is arranged such that the cam section 47 for pushing and moving the drive gear 62 in a thrust direction against the urging force of the coil spring 65 is provided on the side of the perpendicularly bent side plate 41 of the slider member 4. However, in the second embodiment, as shown to FIG. 11, one face of a drive gear 62, namely, the face against which a slider member 4 abuts, is formed in a conical shape 62a.

According to the aforementioned structure, when the forward end of the slider member 4 moves with abutting the conical face 62a of the drive gear 62, the drive gear 62 is moved in a thrust direction to be unmeshed from the rotation gear 61. As a result, an action effect similar to that of the first embodiment is obtained without providing a special cam section 47 on the slider member 4.

Third Embodiment

Figure 12:
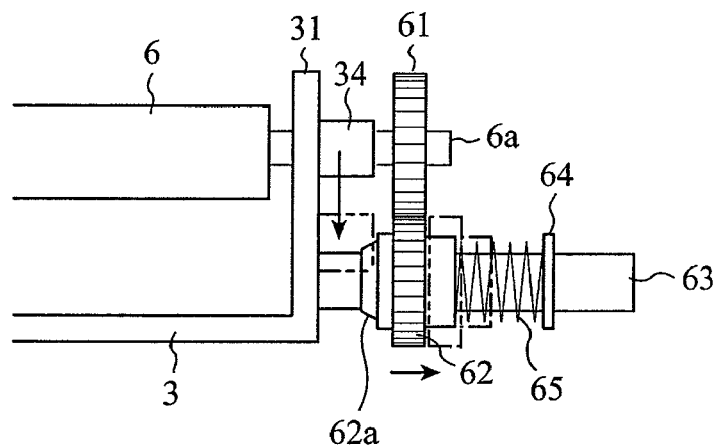
FIG. 12 is a perspective view of an essential part of a disk reproducing apparatus in accordance with a third embodiment of the present invention.
Figure 12:
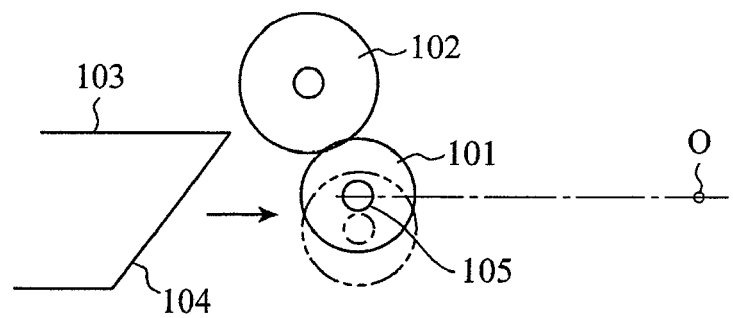
Figure 12:
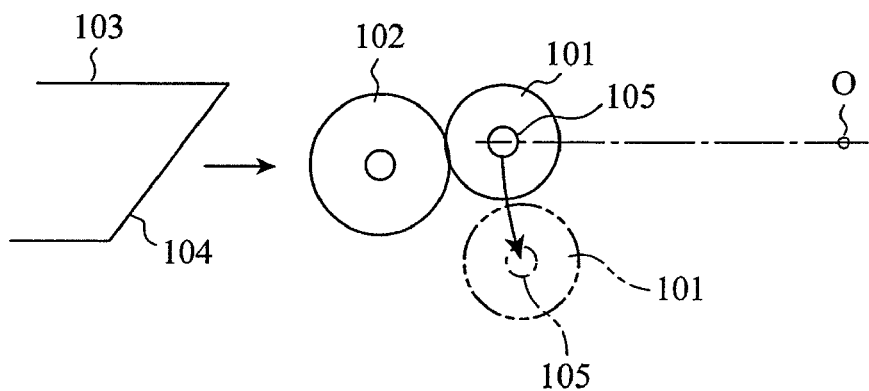

In the third embodiment shown in FIG. 12, a convex 34 that abuts against a drive gear 62 in the process pushed and moved by a slider member 4 is provided on a roller base member 3 for supporting a conveyance roller 6, and either the drive gear 62 or the convex 34 is formed in a slope shape (a conical face 62a). According to such a structure, in the process where the roller base member 3 is forced downwardly by the slider member 4 forwardly moving, the drive gear 62 is moved in a thrust direction by abutting against the convex 34 to be unmeshed from the rotation gear 61. Thus, an action effect similar to that of the second embodiment is obtained.

INDUSTRIAL APPLICABILITY

As discussed above, the disk device according to the present invention prevents scratches onto a disk by the slippage caused between the disk and the conveyance roller, and further downsizes the device by reducing the operation stroke of the slider member. Therefore, the disk device is arranged such that when a disk is loaded in a predetermined position of the device body, the mesh between the drive gear and the rotation gear integral with the shaft of the conveyance roller is released, and after the disk is carried to the reproducing position, the rotation of the conveyance roller can be stopped in a short time. Thus, the disk device according to the present invention is suitable for a thinness-oriented disk device.

The invention claimed is:

1. A disk device for loading and unloading a disk into and from a device body with a conveyance roller, the disk device comprising:
   a slider member to be pushed and moved by the movement of a disk detection member detecting the loading of the disk, when the disk is loaded in a predetermined position of the device body;
   a drive gear that is moved in a thrust direction by the movement of the slider member to be unmeshed from a rotation gear integral with the conveyance roller; and
   an urging member that normally urges the drive gear in a direction in which the drive gear meshes with the rotation gear.

2. The disk device according to claim 1, wherein the slider member is provided on a side face thereof a cam section for moving the drive gear in the thrust direction to release the mesh of the drive gear with the rotation gear, and moves a roller base member in the direction where the conveyance roller is moved away from the disk, the roller base member used for clamping the disk on a turntable, unlocking the a reproducing base from the device body, and supporting the conveyance roller.

3. The disk device according to claim 1, wherein an abutment surface of the drive gear against the slider member is formed in a conical shape.

4. The disk device according to claim 1, wherein the roller base member for supporting the conveyance roller has a convex abutting against the drive gear in the process where the roller base member is pushed and moved by the slider member, and either of the abutment surfaces of the convex and the drive gear is sloped to exert a moving force in the thrust direction on the drive gear.

* * * * *